Oct. 3, 1939.                    O. ROLFSON                    2,175,129

ADJUSTABLE STOPPING DISTANCE GAUGE

Filed Dec. 11, 1936

INVENTOR.
ORVILLE ROLFSON
BY
ATTORNEY.

Patented Oct. 3, 1939

2,175,129

UNITED STATES PATENT OFFICE 2,175,129

ADJUSTABLE STOPPING DISTANCE GAUGE

Orville Rolfson, Windsor, Ontario, Canada

Application December 11, 1936, Serial No. 115,359

1 Claim. (Cl. 116—129)

My invention relates to a new and useful improvement in an adjustable stopping gauge adapted for use on vehicles and intended primarily for mounting adjacent to or on the speedometer so that the operator may observe the speedometer at the same time he observes the present invention. It is preferred that the invention be mounted as illustrated in the drawing in such a way that the indicator or speedometer will serve to cooperatively indicate on the present invention. The distance wherein an automotive vehicle may be brought to a stop will depend upon the speed of the vehicle and the condition of the street or highway surface over which the vehicle is being propelled, assuming that the braking power is properly proportioned to the weight of the vehicle. This distance is easily calculated and for most vehicles which are placed upon the market, the distance required for stopping has already been computed. The distance is different on dry surfaces than it is on wet surfaces.

It is an object of the present invention to provide a device which will clearly indicate to the operator the distance required to stop the vehicle at operated speeds and which may be adjusted to indicate the distance for dry surfaces and wet surfaces.

It is another object of the invention to provide a device of this class which is simple in structure, economical of manufacture and easily and quickly installed and easily adjusted.

Another object of the invention is the provision of a device of this class which is compact and which will not mar the appearance or beauty of the vehicle on which used.

Other objects will appear hereinafter.

The invention consists in the combination and arrangement of parts hereinafter described and claimed.

The invention will be best understood by a reference to the accompanying drawing in which, Fig. 1 is a plan view of the invention showing it mounted for use.

Fig. 2 is a fragmentary, sectional view taken on line 2—2 of Fig. 1.

Fig. 3 is a plan view of the under-disk used in the invention.

In Fig. 1, I have shown the invention applied to a speedometer having the face 8 on which are displayed numbers 9 cooperating with the moveable pointer 10 for indicating the speed at which the vehicle is being driven. In the drawing, I have shown the invention as mounted so as to surround the speedometer. But from the description of the invention, it will appear obvious that the device may be as an integral part of the speedometer. The speedometer 11 is illustrated as enclosed in a casing 12 and mounted on this casing 12 is a retaining ring 13 which retains in position a transparent closure 14. Mounted fixedly so as to embrace the speedometer 11 is an annular member 15 having spaced openings 16 formed therein. An opening 17 is also formed in this annular member 15. Positioned beneath the annular member 15 is an annular member 18 of the same size as the member 15. Projecting upwardly from the member 18 and extending through a slot 20, formed in the member 15, is a stud 21 to which is attached a finger 22 which extends through a slot 23 formed in the retainer 13. By means of this finger 22 the annular member 18 may be rotated about the center of the speedometer 11 as an axis. On the upper face of the annular member 18 is a series of numbers 24 spaced between which is a series of numbers 25. Displayed on the face of the annular member are the words "Dry" and "Wet".

The construction is such that when the finger 22 is moved to the right, to the limit of its movement, the word "Dry" will register with the opening 17 and be displayed. At the same time the series of numbers 24 will be displayed through the openings 16. It will be noted that these openings are positioned outwardly from the displayed numbers 9 so that when the pointer 10 is pointing to one of the numbers 9, it will also be pointing directly to one of the openings 16.

When the finger 22 is moved to the left, the limit of its movement, the stud 21 will engage the left end of the slot 20 and the word "Wet" will be displayed at the opening 17 and the numbers 25 will be displayed at the openings 16. In Fig. 1, the device has been adjusted for use in driving over dry roads, the words "For" and "Roads" being positioned at opposite sides of the opening 17 and displayed on the annular member 15 which is stationary.

When the pointer 10 points to any of the numbers 9, it will also point to the series 24 which appears displayed at the openings 16. These numbers 24 indicate the distance required for stopping the vehicle at given speeds on dry roads. For instance, when the vehicle is driven at 20 miles per hour, the pointer 10 would point to the number 20 on the speedometer and at the same time point to the opening 16 at which the number 44 appears. This would indicate to the driver of the vehicle that a clear space of 44 feet should always be maintained in front of the vehicle as that is the distance over which the vehicle would be driven before the vehicle could be stopped. This is assuming that the brakes are in proper condition, which condition is now generally required by law in most localities.

In driving over wet roads or streets, the operator of the vehicle would merely move the finger 22 to the left so as to display the word "Wet" at the opening 17 and the series of numbers 25 would be displayed at the opening 16, thus indicating to the driver the necessary clear space which should be maintained in front of the vehicle when driving over wet surfaces. The figures displayed in the drawing have been computed for vehicles equipped as automobiles are, at the present time placed upon the market, the areas of the brake surfaces and the weight of the vehicle having all been considered. There is another element which also enters into a computation of these figures, namely, the mental reaction of the driver of the vehicle and this element has also been taken into consideration in making the computation. Consequently, the figures displayed on a device of this kind will, under normal conditions, accurately indicate the clear space necessary to be maintained in front of the vehicle at all times for safe driving.

With a device of this kind mounted on the vehicle, it is believed obvious that safety in vehicle operation will be greatly enhanced.

While I have illustrated and described the preferred form of construction, I do not wish to limit myself to the precise details of structure shown, but desire to avail myself of such variations and modifications as may come within the scope of the appended claim.

Having thus described my invention, what I claim as new and desire to secure by Letters Patent is:

In combination with a vehicle speedometer having a plurality of spaced indicating numbers displayed thereon and provided with a movable pointer for separately pointing to said numbers: a movable display member having a plurality of series of spaced numbers displayed thereon; a stationary member having a plurality of spaced openings formed therein, said openings being spaced apart the same distance as the successive numbers displayed on said movable member; and means for moving said movable member to a position for bringing the numbers of one series into registration with said openings, and to another position for bringing the numbers of another series into registration with said openings; said movable member having adjacent one side, a pair of indicia displayed thereon, and said stationary member having an opening formed therein, the movement of said movable member to one position bringing one of said indicia into registration with the last named opening and the movement thereof to another position bringing the other of said indicia into registration with said last named opening.

ORVILLE ROLFSON.